(12) United States Patent
Fish et al.

(10) Patent No.: US 12,203,708 B2
(45) Date of Patent: Jan. 21, 2025

(54) HEAT EXCHANGER AND ASSOCIATED METHOD OF ASSEMBLY

(71) Applicant: PRATT & WHITNEY CANADA CORP., Longueuil (CA)

(72) Inventors: Jason Fish, Oakville (CA); Ljubisa Vrljes, Etobicoke (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/165,156

(22) Filed: Feb. 2, 2021

(65) Prior Publication Data
US 2022/0243987 A1 Aug. 4, 2022

(51) Int. Cl.
*F28D 7/10* (2006.01)
*B23P 15/26* (2006.01)

(52) U.S. Cl.
CPC .............. *F28D 7/106* (2013.01); *B23P 15/26* (2013.01)

(58) Field of Classification Search
CPC ... F28D 7/106; F28D 7/10; F28D 7/00; F28D 7/103; F28D 7/14; F28D 7/16; F28D 7/1607; F28D 7/163; F28F 1/426; F28F 1/10; F28F 1/08; F28F 1/06; F28F 1/022
See application file for complete search history.

(56) References Cited

U.S. PATENT DOCUMENTS

| | | | |
|---|---|---|---|
| 2,713,996 A * | 7/1955 | Pottharst, Jr. ........... | F28D 7/106 165/145 |
| 4,210,199 A * | 7/1980 | Doucette ................. | F28D 7/106 165/70 |
| 4,281,710 A * | 8/1981 | Hadlock ................. | F28F 1/424 165/142 |
| 4,440,217 A | 4/1984 | Stieler | |
| 4,523,637 A * | 6/1985 | Abramo .................... | F28D 7/06 165/104.34 |
| 10,221,768 B2 | 3/2019 | Agg | |
| 2008/0251241 A1* | 10/2008 | Yusa ......................... | F28F 1/06 165/154 |
| 2009/0088074 A1 | 4/2009 | Limbaugh et al. | |
| 2013/0145732 A1* | 6/2013 | Gwynn ..................... | F28D 1/00 55/447 |
| 2015/0198373 A1* | 7/2015 | Zhang ....................... | F28F 9/02 165/154 |

FOREIGN PATENT DOCUMENTS

| | | |
|---|---|---|
| CN | 112378275 A * | 2/2021 |
| DE | 1501566 | 10/1969 |
| DE | 10212788 | 9/2004 |
| GB | 835017 | 5/1960 |
| JP | 2009150573 | 7/2009 |
| WO | 2006073134 | 7/2006 |

* cited by examiner

*Primary Examiner* — Harry E Arant
(74) *Attorney, Agent, or Firm* — Norton Rose Fulbright Canada LLP

(57) ABSTRACT

The heat exchanger can have a first fluid circuit extending from a first inlet to a first outlet, one or both having a first mouth dividing internally into a number of passages within a periphery, a second fluid circuit fluidly distinct from the first fluid circuit, extending from a second inlet to a second outlet, the second fluid circuit in thermal exchange contact with the number of passages in a heat transfer region of the heat exchanger, and an adapter having a second mouth secured to the first mouth in a manner to establish internal fluid flow communication therewith.

11 Claims, 5 Drawing Sheets

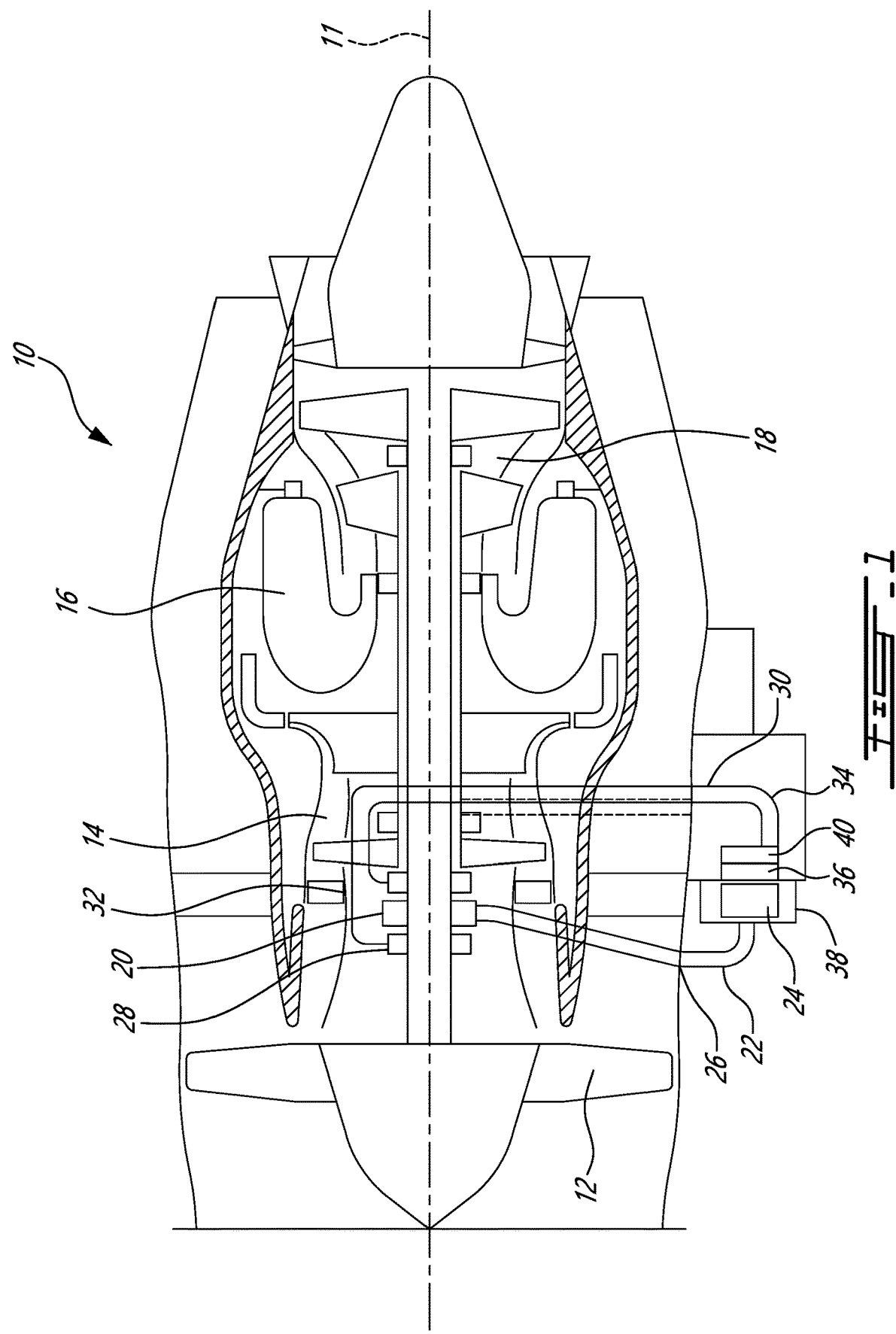

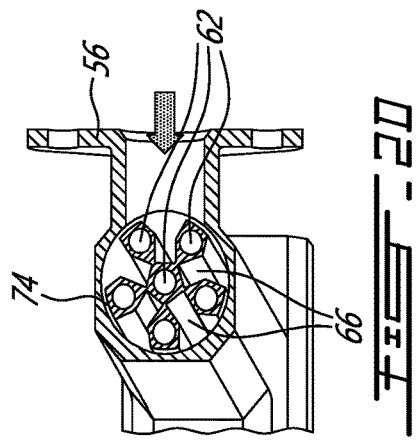
FIG-2D
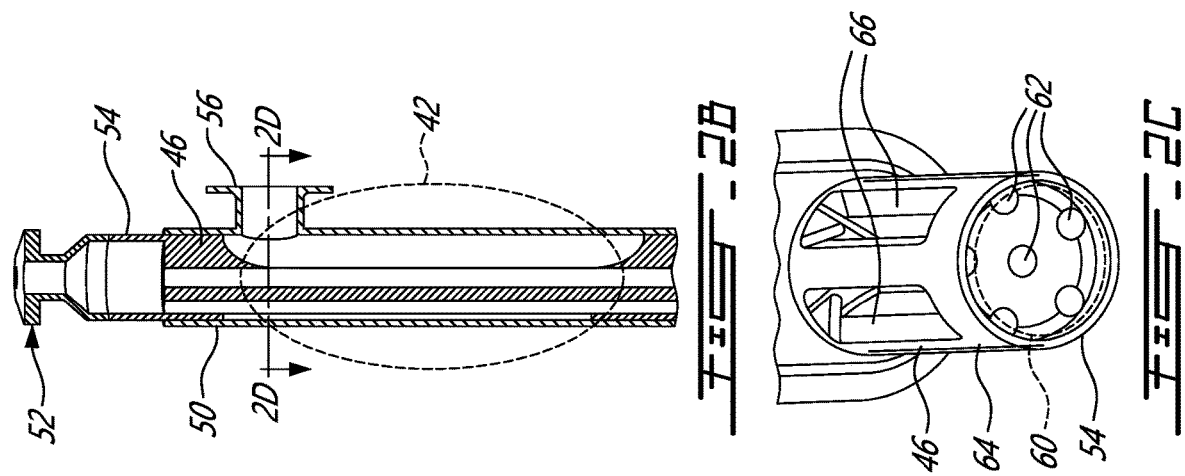
FIG-2B
FIG-2C
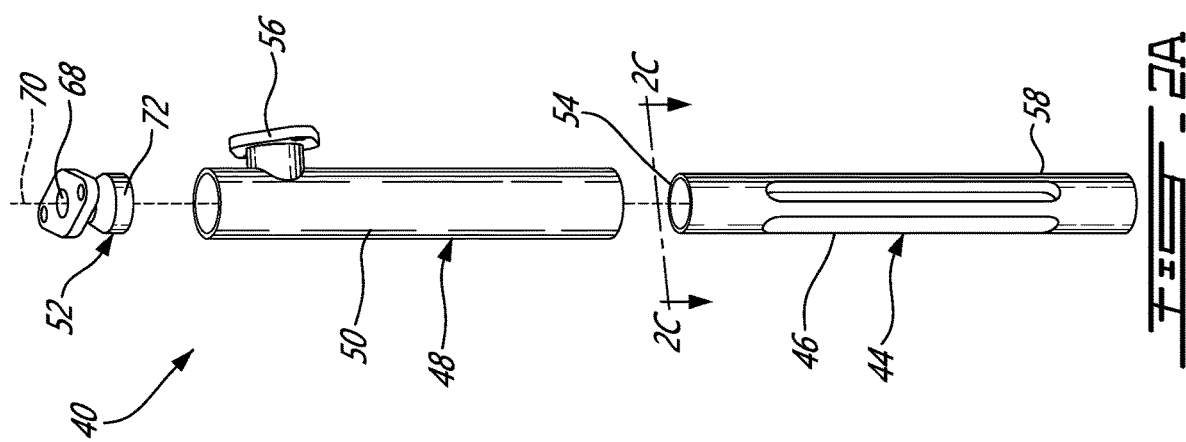
FIG-2A

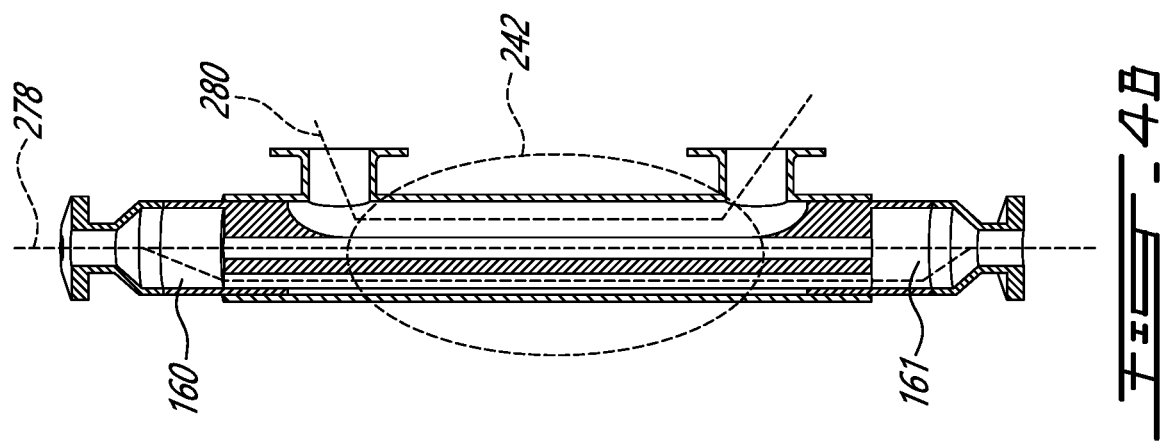
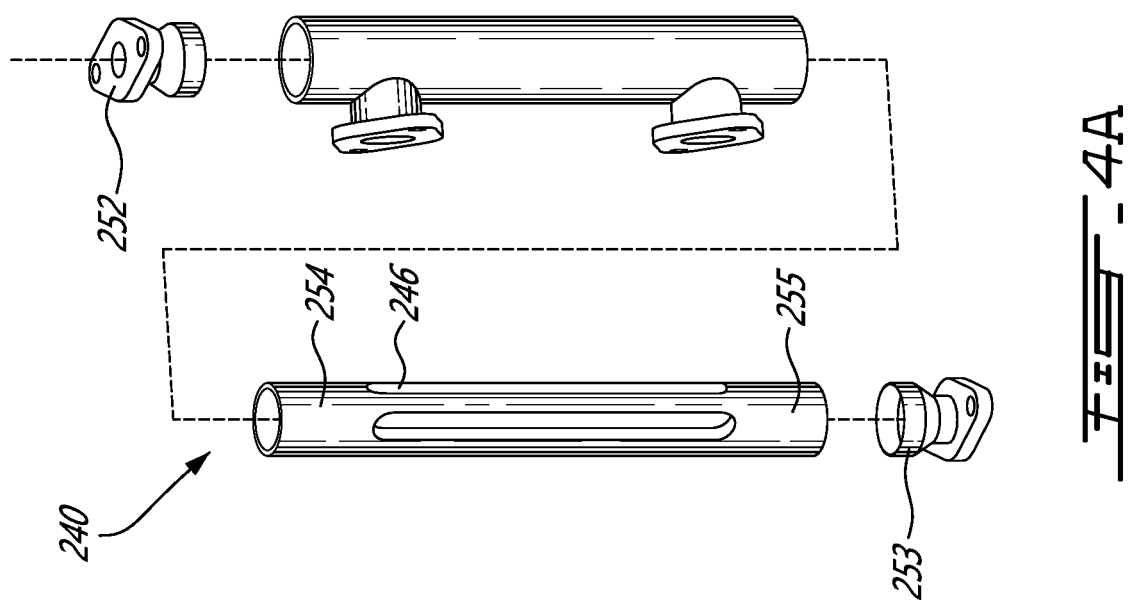

HEAT EXCHANGER AND ASSOCIATED METHOD OF ASSEMBLY

TECHNICAL FIELD

The application relates generally to gas turbine engines and, more particularly, to heat exchangers.

BACKGROUND OF THE ART

Heat exchangers are used in various contexts to transfer heat from one fluid stream to another, for heating, cooling or both. While various configurations of heat exchangers exists, there always remains room for improvement. In aircrafts, for instance, weight can be a significant concern, in addition to footprint (volume), durability, reliability and costs. Lower weight can sometimes be achieved by improving heat transfer efficiency. One strategy to improve efficiency is to divide the flow into a number of flow path, and thereby facilitate heat transfer between the narrower flow paths and the other fluid as compared to between a single larger flow path and the other fluid. This approach can, however, pose design challenges.

SUMMARY

In one aspect, there is provided a heat exchanger comprising: a first fluid circuit extending from a first inlet to a first outlet, at least one of the first inlet and the first outlet having a first mouth dividing internally into a number of passages within a periphery, a second fluid circuit fluidly distinct from the first fluid circuit, extending from a second inlet to a second outlet, the second fluid circuit in thermal exchange contact with the number of passages in a heat transfer region of the heat exchanger, and an adapter having a second mouth secured to the first mouth in a manner to establish internal fluid flow communication therewith.

In another aspect, there is provided a method of assembling a heat exchanger, the method comprising: engaging a proximal end of an arm into a distal opening of a sleeve, along a length of the sleeve, and out a proximal opening of the sleeve, the proximal end of the arm having a first mouth having a periphery and dividing into a plurality of internal passages internally to the periphery; securing an adapter to the proximal end of the arm, the adapter having a second mouth having a periphery, the second mouth fluidly connected to a port, including securing the periphery of the second mouth to the periphery of the first mouth.

In a further aspect, there is provided a heat exchanger comprising a first housing having an arm having a length extending from a proximal end to a distal end, a first fluid path having a mouth at the proximal end and manifolding from the mouth into a plurality of internal passages extending along the length towards the distal end, a second housing having sleeve having a cavity extending from a proximal opening to a distal opening, configured for receiving the arm of the first housing therein through the distal opening into an assembled configuration, in which assembled configuration the proximal end of the arm protrudes from the proximal opening and a second fluid path is defined and extends between the sleeve and the arm, and an adapter having a first end secured to a periphery of the mouth, in fluid communication therewith, and a second end having a port.

DESCRIPTION OF THE DRAWINGS

Reference is now made to the accompanying figures in which:

FIG. 1 is a schematic cross-sectional view of a gas turbine engine;

FIG. 2A is an exploded view of a portion of a heat exchanger in accordance with an example;

FIG. 2B is a longitudinal cross-sectional view of the heat exchanger of FIG. 2A;

FIG. 2C is a view taken along line 2C-2C in FIG. 2A;

FIG. 2D is a cross-sectional view taken along lines 2D-2D of FIG. 2B;

FIG. 4A is an exploded view of a second example of a heat exchanger;

FIG. 4B is a cross-sectional view of the heat exchanger of FIG. 4A.

DETAILED DESCRIPTION

Figure 3B:
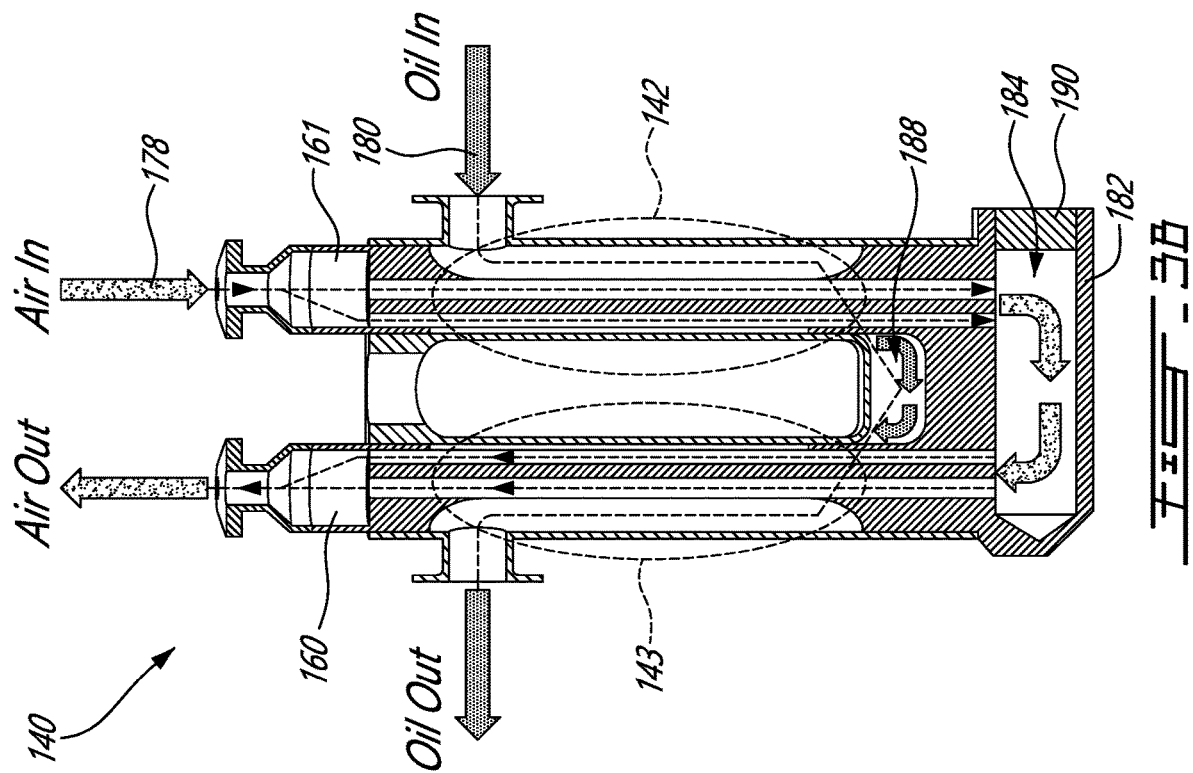
FIG. 3B is a cross-sectional view of the heat exchanger of FIG. 3A.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases.

The compressor 14, fan 12 and turbine 18 have rotating components which can be mounted on one or more shafts. Bearings 20 are used to provide smooth relative rotation between a shaft and casing (non-rotating component), and/or between two shafts which rotate at different speeds. An oil lubrication system 22 including an oil pump 24, sometimes referred to as a main pump, and a network of conduits and nozzles 26, is provided to feed the bearings 20 with oil. Seals 28 are used to delimit bearing cavities 32 and contain the oil. A scavenge system 30 having cavities 32, conduits 34, and one or more scavenge pumps 36, is used to recover the oil from the bearing cavities 32, which can be in the form of an oil foam at that stage. The oil pump 24 typically draws the oil from an oil reservoir 38, and a heat exchanger 40, can be used in the return line to cool the oil with air or another fluid such as fuel, for instance.

Generally, the heat exchanger 40 can have two fluid circuits distinct from one another from the point of view of fluid circulation (i.e. the fluids do not mix within the heat exchanger) and one or more region where the two fluid circuits are placed in thermal exchange contact with one another, meaning that during operation, heat from the hotter one of the circulating fluids is transferred to the colder one of the circulating fluids across some form of structure which separates the fluid circuits from one another. Both cross-flow and concurrent flow configurations are possible. In the cross-flow configuration, the first fluid circulates in a direction opposite the direction of the second fluid, whereas in the concurrent flow configuration both fluids circulate in the same orientation. Different ones of these configurations can be preferable in different embodiments, and the choice is left to the designer of a specific embodiment.

FIGS. 2A-2D presents a portion of an example heat exchanger 40 and more specifically a portion surrounding a heat transfer region 42. As presented generally in FIG. 2A, the heat exchanger 40 includes at least three components: a first housing 44 having an arm 46, a second housing 48 having a sleeve 50 having a hollow tube open at both ends and configured for receiving the arm 46, and an adapter 52 configured for being secured to the tip of the arm 46, also referred to as the proximal end 54 of the arm. The arm 46 has a first, internal, fluid path for conveying a first fluid along the heat transfer region 42. In this embodiment, a second fluid path if formed internally to the sleeve 50, and externally to the arm 46, otherwise said between the structure/wall of the sleeve 50 and the structure of the arm 46, when the heat exchanger 40 is in the assembled configuration, such as shown in FIG. 2B. Another adapter 56 can be integrated to the second housing 48, in fluid flow communication with the hollow of the sleeve 50/second fluid path. The first fluid path can form part of a first circuit including a first inlet and a first outlet (only one of which is shown in FIG. 2B, associated to the adapter 52), whereas the second fluid path can form part of a second circuit including a second inlet and a second outlet (only one of which is shown in FIG. 2B, associated to the adapter 56).

In this specification, the expression "proximal" will be used to refer to the region where the arm 46 protrudes from the sleeve 50, and the expression "distal" can be used to refer to the other end 58 of the length of the arm 46, to facilitate reference in the text below. Accordingly, the sleeve 50 can be said to have an internal cavity, or hollow, extending from a proximal opening at the proximal end, to a distal opening at the distal end, and configured to receive the arm therein.

In the illustrated embodiment, the proximal end 54 of the arm 46, shown enlarged on FIG. 2C, can have a larger conduit portion, which will be referred to as a "mouth" 60 herein, which manifolds into a plurality of internal passages 62 to favor heat transfer efficiency with the other fluid. Similarly, the arm 46 has a generally cylindrical outer face 64 into which a number of circumferentially interspaced lengthwise-oriented grooves 66 are formed, creating a plurality of outer passages of the second fluid path in the heat transfer region 42. This latter plurality of passages can be referred to herein as the outer passages, though it will be understood that they are internal to the sleeve 50, and in fact partially defined by the sleeve 50. In this embodiment, and perhaps as best seen in FIG. 2D, the grooves 66/outer passages and many of the inner passages 62 (except the central one here) are circumferentially interspersed, which can be beneficial from the point of view of heat transfer efficiency.

Several reasons can motivate the use of an adapter 52 as a distinct component (see FIG. 2A) to be later assembled to the proximal end 54 of the arm 66 (see FIG. 2B). Indeed, in some embodiments, it can be preferred to manufacture the arm 46 by machining. In this case, one may need free lengthwise access to each one of the cross-sectional positions of the internal passages 62 from the proximal side of the arm 46, to be able to drill each one of the internal passages along the length of the arm 46. On the other hand, the adapter 52 can be provided with a port 68 and a coupler 70 which may prevent the desired access for the machining operation if it is not provided as a separate component to be later assembled. Moreover, in embodiments such as the one presented in FIG. 2A to 2D, the connector structure 70, which can be required to satisfy fluid connection standards associated to the environment of use and/or for other considerations, may be transversally larger than the internal cross-sectional diameter of the sleeve 50, and thereby prevent introduction of the arm 46 into the sleeve 50 if not provided as a separate component to be later assembled. Other restrictions specific to certain embodiments may also exist and motivate the use of an adapter as a distinct component.

When an adapter 52 is provided as a distinct component, the question arises as to how to establish a durable, reliable, low weight, low cost, leak-proof joint between the adapter 52 and the proximal end 54 of the arm 46, and more specifically between the adapter 52 and the plurality of internal passages 62. In some embodiments, not shown, it can be considered to use a plurality of distinct tubes to form the internal passages as opposed to machining. However, this may require forming individual weld joints between each end of each tube and some form of housing, which may not be satisfactory in some embodiments due to, for instance, the additional costs associated to the multiple weld joints including welding and inspection.

In an embodiment such as presented in FIG. 2A-2D, it was preferred to establish the connection between the adapter 52 and the proximal end 54 of the arm with a single assembly step. In the illustrated, in addition to the individual internal passages 62 which can each individually be created along the length of the arm by drilling, a larger conduit portion which will be referred to as a mouth 60, is also formed at the proximal end 54 of the arm 46. The mouth 60 can also be machined by introducing a larger diameter machining tool into the proximal end 54 of the arm 46, for instance. The mouth 60 can then manifold into the plurality of internal passages 62. Moreover, outer passages 66 can be machined into the outer diameter 64 of the generally cylindrical geometry of the arm 46 by machining. In alternate embodiments, the cross-sectional shape of the arm can vary, and can be generally rectangular for instance, instead of circular.

In a cylindrical geometry, the mouth 60 can have a circular tip. The adapter can be provided with a first end 72 having generally the same geometry as the mouth 60, such as, for this specific example, a cylindrical wall terminating at a circular tip (see cross-section of FIG. 2B), and the first end 72 of the adapter 52 can be welded to the circular tip of the mouth 60. It will be understood, however, that in alternate embodiments, different approaches can be preferred, and it can be preferred to assemble the adapter to the proximal end of the arm by brazing, or even bolting flanges protruding transversally to the fluid path to one another, amongst other possible techniques.

As further shown in FIG. 2D, the second adapter 56 can be transversally oriented and lead into the cavity formed between the sleeve 50 and the arm 46. In this embodiment, the diameter of the cylindrical geometry of the arm can be smaller than the internal diameter of the sleeve to provide a spacing 74 between the arm 46 and the sleeve 50 in which the second fluid can circulate circumferentially in addition to circulating lengthwisely along the grooves 66.

Figure 3A:
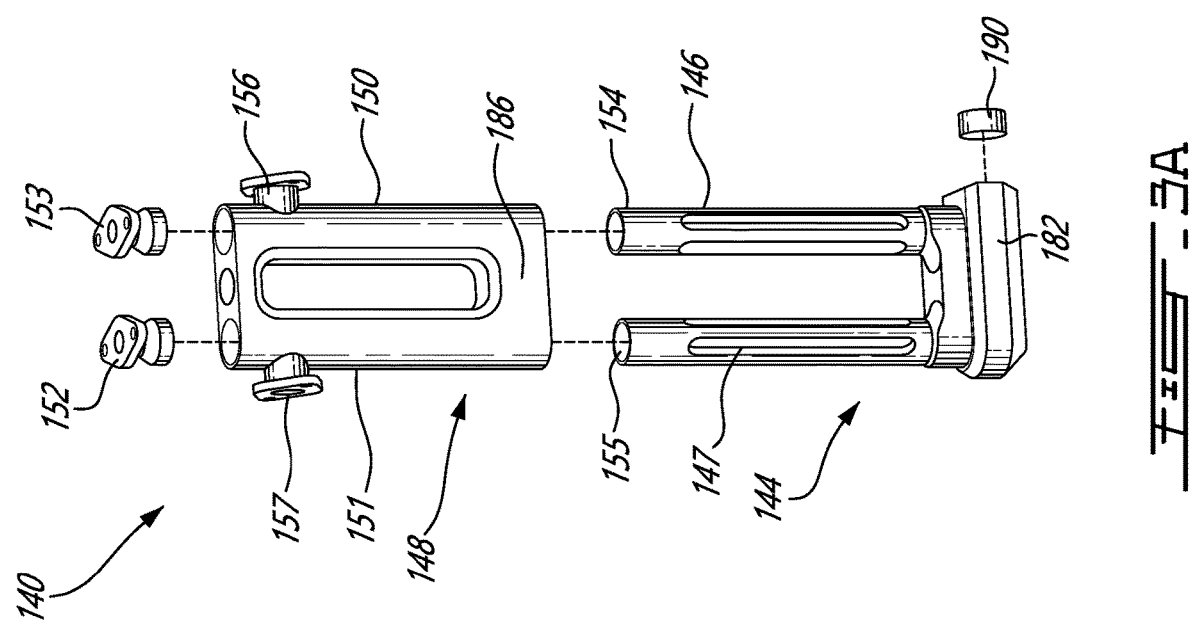
FIG. 3A is an exploded view of a first example of a heat exchanger.

FIGS. 3A and 3B present a first complete example embodiment of a heat exchanger 140 integrating the concepts presented above, and which can be used, for instance, as an air/oil heat exchanger. In this embodiment, the first fluid circuit 178 and the second fluid circuit 180 are both generally U-shaped and are close to coinciding in the heat transfer regions 142, 143. Indeed, while maintaining distinct passages from the fluid-circulation point of view, two distinct heat exchange regions 142, 143 are provided in which heat can be transferred from the first fluid to the second fluid at a relatively high rate, across the structure of two, corresponding arms 146, 147 engaged with respective sleeves 150, 151.

Indeed, the first housing 144 generally includes a first arm 146 and a second arm 147, which can each individually, generally be constructed such as the arm 46 presented above. Both arms 146, 147 are parallel and structurally interconnected by a structural member which will be referred to herein as a base 182 which has a first cavity 184 formed therein. The cavity 184 can be fluidly connected to the internal passages of both arms 146, 147, and act as a mixing chamber during operation, to further favor heat exchange efficiency along the second arm 147, such as best seen in FIG. 3B.

The heat exchanger 140 can further include both a first adapter 152 and a second adapter 153, each one of the adapters being generally like adapter 52 and secured to the proximal end of a corresponding arm 146, 147.

The first fluid circuit 178 can thus extend from a port provided in the second adapter 153, into a first inlet which can be in the form of a mouth 161, can divide downstream of the mouth 161 into a first set of internal passages, recombine in the mixing chamber 184, re-divide into a second set of internal passages extending along the second arm 147, exit the internal passages into a first mouth 160 acting as a first outlet, and exit the heat exchanger 140 through a port in the first adapter 152.

The two sleeves 150, 151 can also be structurally interconnected by a transversal connecting segment 186, which can alternately be referred to as a structural member, forming a distally-open channel in the second housing, the distally-open channel also fluidly connecting the hollows of the two sleeves 150, 151. A second mixing chamber 188 can be provided in the form of a spacing formed between the inner surface of the connecting segment 186 and the corresponding outer surface of the base 182. Indeed, the base 182 and the channel can be configured for the distal opening of the channel to become closed by the base when in the assembled configuration such as shown in FIG. 3B.

The second fluid circuit 180 can extend from a port provided in a second inlet to communicate with the spacing formed between the first arm 146 and the first sleeve 150, and the lengthwise outer passages formed in the first arm 146, extend along the length of the first arm 146, communicate with the second mixing chamber 188 and then with the spacing formed between the second arm 147 and the second sleeve 151, extend along the length of the second arm 147, and to a transversally-oriented second outlet and more specifically across a port thereof. The latter presents a concurrent-flow configuration. For establishing a cross-flow configuration, the second inlet and second outlet can be interchanged, for instance, or the first inlet and the first outlet can be interchanged.

The first cavity 184 can also be machined in the base by introducing a drilling tool transversally into the base, and the hole can then be closed by a plug 190, which can be secured in place in a watertight fashion by brazing or welding for instance.

Figure 3C:
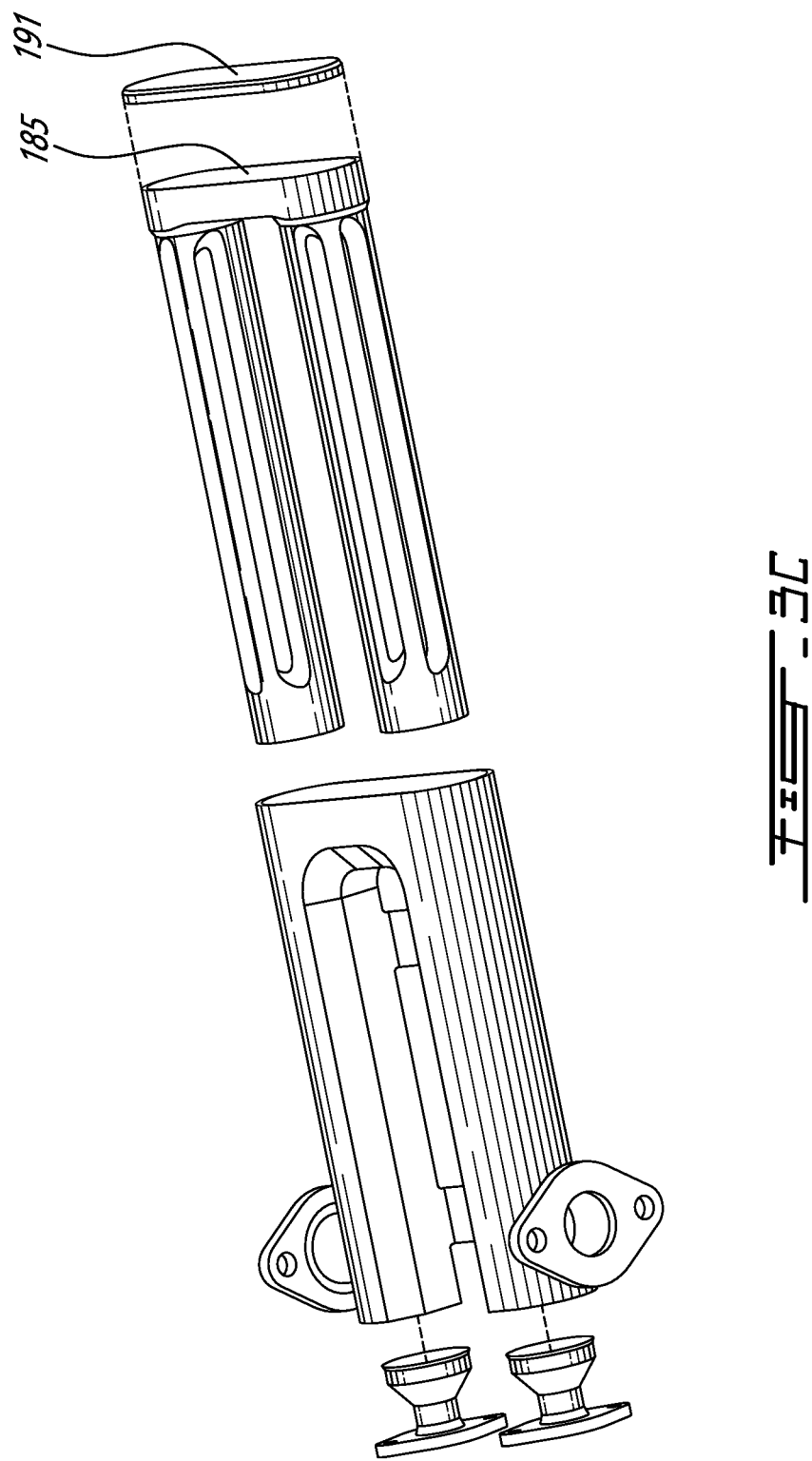
FIG. 3C presents a variant to the example of FIG. 3A.

In an alternate embodiment shown in FIG. 3C, the first cavity 185 can be machined by milling a groove into the bottom of the base, for instance, and the groove can then be closed by capping, e.g. by welding a cap 191 onto the distal end of the base.

Returning to FIG. 3B, the proximal ends 154, 155 of the arms 146, 147 can have an outer diameter designed to closely fit the internal diameter of the proximal ends of the sleeves 150, 151 to form a close fit, and a watertight seal can be established between the corresponding peripheries by brazing, to name one example. Similarly, the connecting segment 186 of the second housing 148 and the base 182 of the first housing 144 can be shaped with a common periphery, allowing them to snugly engage and closely fit with one another, and a watertight seal can be established around the periphery by brazing, to name one example. In this example, the common periphery between the inner surface of the connecting segment 186 and the outer surface of the base 182 is obround, with two semi-circular features each at a corresponding transversal end, and a straight segment therebetween, though it will be understood that various other shapes can achieve a suitable result.

In this example, the adapters 152, 153, 156, 157 are provided with a coupler 70, which is configured for connecting with another component of the gas turbine engine. The coupler 70 has a broadened cross-section with a central aperture serving as a port, and two additional apertures. The coupler 70 can be configured to establish a watertight connection with a similar coupler feature of another device or conduit, and be secured to it by engaging bolts or the like into the two additional apertures, with a seal sandwiched between the abutting planar faces of the couplers.

FIGS. 4A and 4B present a second complete example embodiment of a heat exchanger 240 integrating the concepts presented above. In this embodiment, the first and second fluid circuits 278, 280 are both generally linear and generally coincide, though the second fluid circuit 280 may be said to have a widened U shape due to its transversally oriented inlet and outlet. Indeed, while maintaining distinct passages from the fluid-circulation point of view, a common heat exchange region 242 is provided in which heat can be transferred from the first fluid to the second fluid at a relatively high rate, across the structure of the arm.

The heat exchanger 240 can further include both a first adapter 252 and a second adapter 253, the first adapter 252 being secured to the proximal end 254 of the arm 246, and the second adapter 253 being secured to the distal end 255 of the arm 246. In another embodiment, not shown, it can be preferred to include only a first adapter as an initially separate component later assembled to the arm, and to machine the second adapter integrally with the other machining operations performed on the arm, as even if the connector is wider than the internal cross-sectional area of the sleeve, the second adapter does not need to be engaged into the internal area of the sleeve at any time, only the proximal end of the arm is engaged at assembly, until it protrudes from the proximal end of the sleeve. However, in the illustrated embodiment, there was a challenge in forming an internal cavity similar to the mouth 160 to fluidly combine the individual flows of the internal passages, and for this reason, it was preferred to use a second adapter distinct from the initial structure of the arm, to form a second mouth 161, and to later weld the second adapter 253 to the corresponding mouth 161.

It was found that achieving multiple inner passages with low number of pieces can help in limiting the amount of weld/braze joints and thereby limit the number of NDT inspection points and potential failure points between circuits. It can provide satisfactory heat transfer efficiency by providing greater surface area between air and oil.

In some specific embodiments, a mixing chamber can be provided for both air and oil to facilitate the u-shaped design and keep the unit compact in length. The mixing chambers can help to prevent the fluids from reaching uniform temperature and velocities as they travel along the passages. The fluids can be forced to exit the passages into the mixing chambers and then re-enter the second set of passages as they travel up the second heat exchanger leg. The heat exchanger, which can be an oil cooler, can have 2 primary machined bodies—one for oil and one for air. By having only 2 bodies, the joints to seal and inspect can be minimized. The 2 parts can be brazed together at both ends to separate the fluids and allow for x-ray inspection. End caps, or end adapters, can be welded on the air side to allow connection of feed tubes. The air body can be kept as a single contiguous part with multiple air passages by gun-drilling or EDMing small holes down the lengths of the cooler legs. Maximum exposure to the oil for cooling can be provided by milled (or EDMed) channels between the drilled passages. Keeping all of the passages in a single body can allow for a single joint between the air and oil bodies as opposed to alternate embodiments using multiple tubes housed in a surrounding body. Indeed, multiple joints may be required to join multiple tubes and may make inspection of the joints by x-ray impossible, which may be undesired.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A heat exchanger comprising:
   an inner housing and an outer housing, the inner housing received within the outer housing;
   a first fluid circuit extending from a first inlet to a first outlet and defined within the inner housing, the inner housing extending from a first inner housing end to a second inner housing end, at least one of the first inner housing end and the second inner housing end having a first mouth dividing internally into a number of passages, the passages including peripheral passages within a periphery, and a central passage surrounded by the peripheral passages, the passages defined by a monolithic body of the inner housing;
   a second fluid circuit fluidly distinct from the first fluid circuit, the second fluid circuit defined internally of the outer housing and externally of the inner housing, the second fluid circuit extending from a second inlet to a second outlet, the second fluid circuit in thermal exchange contact with the number of passages in a heat transfer region of the heat exchanger, a portion of the inner housing protruding beyond an end of the outer housing, the second fluid circuit having a plurality of outer passages, each of the plurality of outer passages disposed circumferentially between, and radially overlapping, two passages of the passages of the first fluid circuit in the heat transfer region, and
   an adapter having a second mouth secured to the first mouth in a manner to establish internal fluid flow communication therewith, the adapter having a first adaptor end adapted to be secured to a fluid line and a second adaptor end, a periphery of the portion of the inner housing secured to a periphery of the second adaptor end via a weld joint or a braze joint, the adaptor having an adaptor inlet at the first adaptor end and an adaptor outlet at the second adaptor end, the adaptor outlet fluidly connected to the first mouth, the adaptor defining a fluid passage extending from the adaptor inlet to the adaptor outlet wherein the inner housing is a first arm, the inner housing further having a second arm having a third mouth at a proximal end, the adapter is a first adapter, wherein the outer housing is a first sleeve, the outer housing further having a second sleeve receiving the second arm therein in an assembled configuration, further comprising a second adapter having a fourth mouth secured to the third mouth, wherein the monolithic body forms the first arm and the second arm.

2. The heat exchanger of claim 1 wherein the first inlet has the first mouth, the first outlet has a third mouth dividing internally into a second number of passages, the adapter is a first adapter, further comprising a second adapter having a fourth mouth secured to the third mouth.

3. The heat exchanger of claim 1 wherein the passages each have a circular cross-section and extend lengthwisely from a corresponding location within the periphery of the first mouth.

4. The heat exchanger of claim 1 wherein the inner housing includes a body extending longitudinally along an axis, the body defining members circumferentially distributed around the axis and extending radially away form the axis, each of the members defining a respective one of the passages extending therethrough, each of the plurality of outer passages defined circumferentially between each set of two adjacent ones of the members.

5. The heat exchanger of claim 1 wherein the first arm and second arm are parallel to one another and fluidly interconnected by a transversally-extending mixing cavity, the number of passages of the inner housing merging into a single passage defined by the transversally-extending mixing cavity.

6. The heat exchanger of claim 5 wherein the mixing cavity has an aperture closed by a plug or cover.

7. The heat exchanger of claim 1 wherein the second fluid circuit has a segment extending transversally between the first and second sleeves.

8. The heat exchanger of claim 7 wherein the segment is a mixing cavity formed between the outer housing and the inner housing, the number of passages of the inner housing merging into a single passage defined by the mixing cavity.

9. The heat exchanger of claim 1 wherein the second fluid circuit further comprises a circumferential spacing between the inner housing and the outer housing.

10. The heat exchanger of claim 1 wherein an outer surface of the inner housing further comprises a plurality of grooves defined therein and extending along a length of the inner housing.

11. The heat exchanger of claim 1 wherein the inner housing and the outer housing are brazed to one another at a base and at the proximal ends of the arms.

\* \* \* \* \*